3,312,318
TRANSMISSION AND BRAKE FOR CRAWLER TYPE VEHICLES
Arthur P. Ryan, 35 Health St., Dansville, N.Y. 14437
Substituted for abandoned application Ser. No. 259,995, Feb. 20, 1963. This application Sept. 3, 1965, Ser. No. 484,970
1 Claim. (Cl. 192—4)

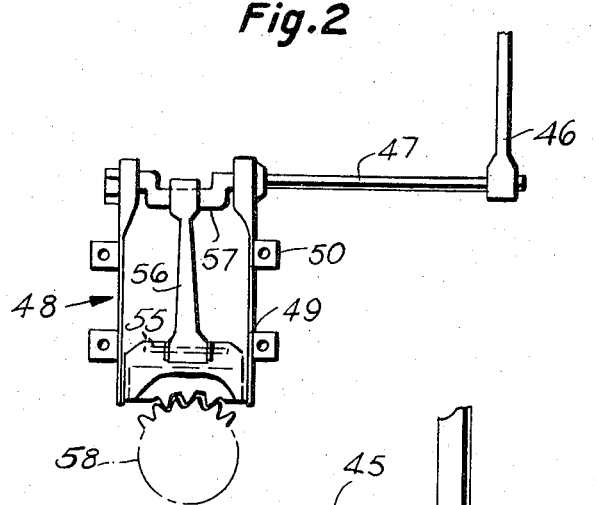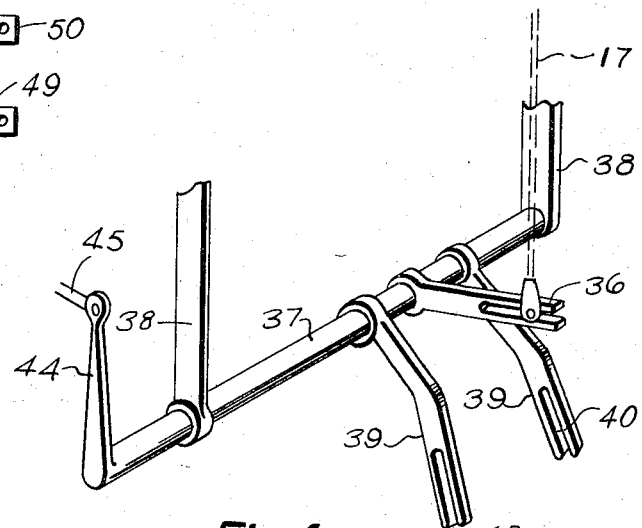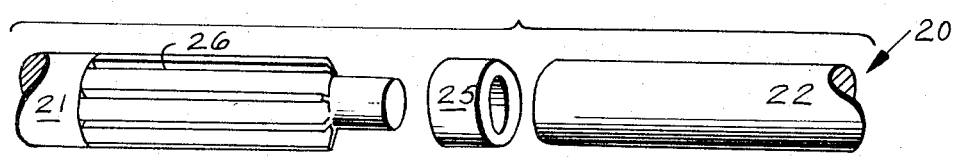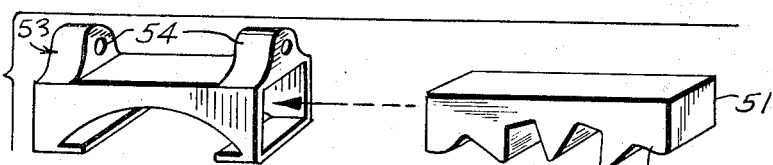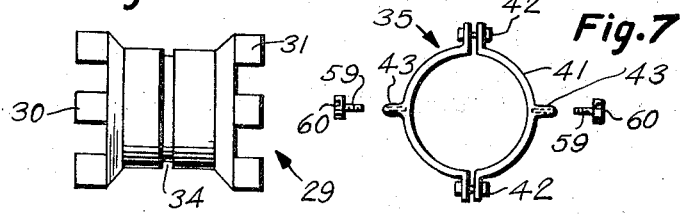
INVENTOR.
Arthur P. Ryan

This application is a substitute for abandoned application Ser. No. 259,995, filed Feb. 20, 1963.

This invention relates to steering controls, and more particularly to steering controls and mechanisms for heavy type industrial equipment.

It is generally well known to those skilled in the art that crawler mounted power shovels and cranes are steered during travel so that the direction of travel is changed by means of taking one crawler belt out of operation. This is accomplished by various methods whereby the end result is that one of the crawler belts is immobilized while the opposite crawler belt is retained in operative position, thus travel direction is obtained by a skidding, sliding or slewing action. It will be apparent that the friction and drag thus produced will vary depending upon the terrain being traveled. However, in rough or soft footing the additional stress and strain upon the equipment is enormous and results in many instances in costly breakdowns.

It is therefore the main purpose of this invention to provide an improved easy steering design for crawler mounted power shovels and cranes which will reduce the stress and strain by at least ninety percent, thereby preventing such breakdowns and immobilization of the equipment.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 2 is a side elevational view of the locking assembly taken along the lines 2—2 of FIGURE 1 and viewed in the direction indicated by the arrows.

FIGURE 3 is a fragmentary perspective view of the clutch shaft and associate members.

FIGURE 4 is an exploded view of the shaft element.

FIGURE 5 is an exploded view showing certain details comprising the locking assembly.

FIGURE 6 is a side elevational view of the fan clutch.

FIGURE 7 is an end elevational view of the shift collar employed in association with the fan clutch.

Figure 1:
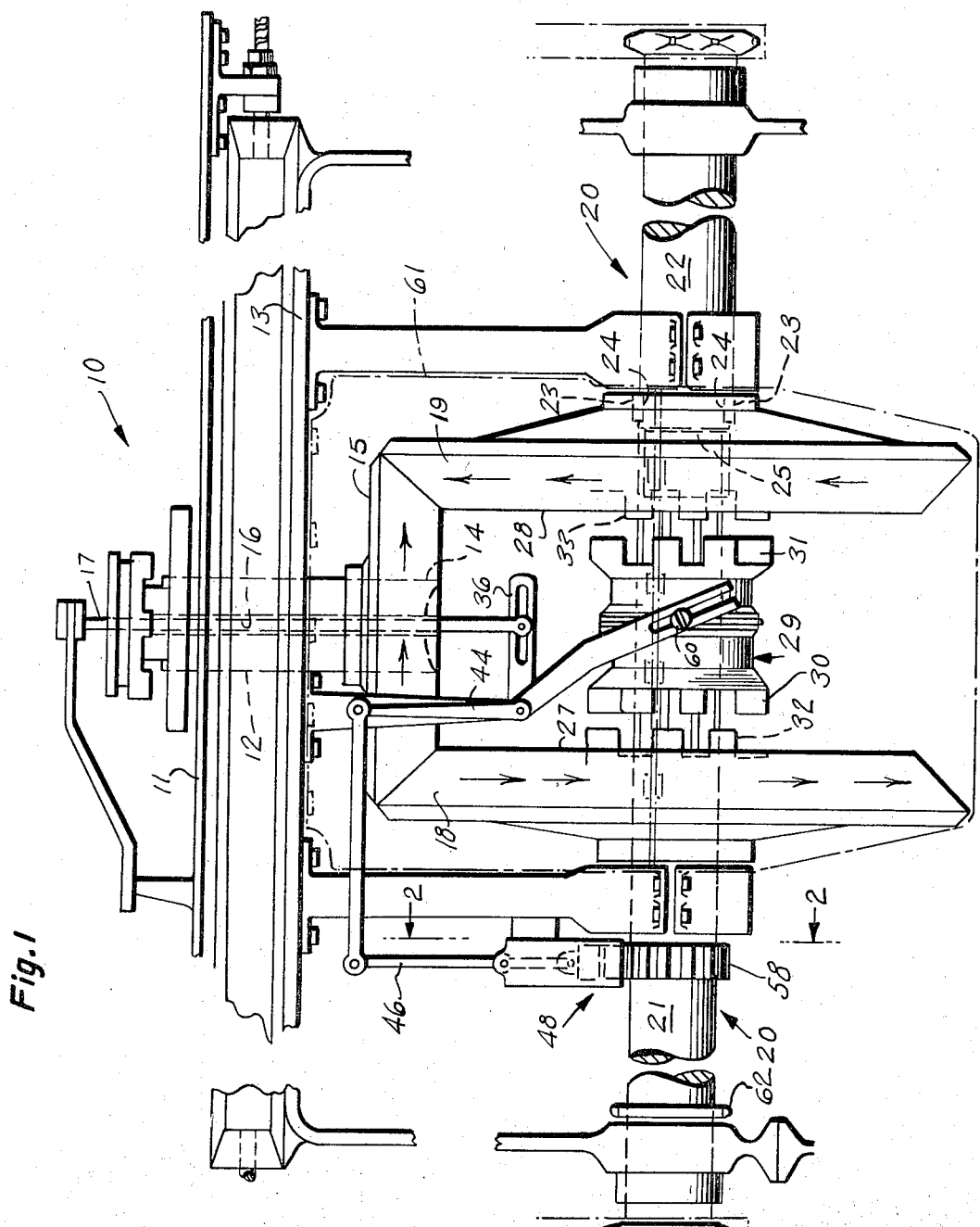
FIGURE 1 is a side view of this invention shown in elevation.

According to this invention, an improved easy steering design for crawler mounted power shovels and cranes 10 is provided with a machinery deck 11, through which a vertically extending propelling shaft 12 depends downwardly through the deck of the carrier body 13. It will be noted that the shaft is centrally positioned relative to the left and right sides of the vehicle comprising the equipment. Upon the lower end 14 of the shaft a horizontal propelling bevel gear 15 is mounted. A centrally disposed opening 16 extends through the shaft 12 and a vertically extending rod 17 is retained frictionally free within for vertical movement relative thereto. A pair of bevel gears 18 and 19 are mounted upon a horizontal propelling shaft 20 and are in engagement with the horizontal propelling bevel gear 15, the horizontal propelling shaft being composed of two separate elements 21 and 22. The bevel gear 18 is mounted rotatably free around shaft element 21 and the bevel gear 19 is keyed to the shaft element 22 by means of keys 23 and keyways 24. The shaft element 22 is machined or turned down on its end and a bronze bushing 25 is installed thereupon. The terminal ends of the shaft elements 21 and 22 meet centrally within the hub of bevel gear 19 as will be seen in FIGURE 1 of the drawing. It will be noted that the width of the bushing 25 is determined by the distance of insertion of the shaft into the gear hub, thereby assuring perfect alignment of the shaft elements. Shaft element 21 is provided with splines 26 which extend the full distance between the faces 27 and 28 of the bevel gears 18 and 19 respectively. A jaw type clutch 29 is supported frictionally free in order to travel laterally on the spline portion 26 of shaft element 21, the jaw clutch being provided with teeth 30 and 31 on its opposite sides, these teeth being in alignment to engage corresponding teeth 32 and 33 on bevel gears 18 and 19 respectively. The jaw clutch is provided with a circumferential groove 34 within which the clutch collar 35 is seated and retained rotatably free relatively thereto. The lower end of the rod 17 is connected to the outward end of a lever 36, the opposite end of which is connected and rigidly secured to a shaft 37 supported rotatably free between brackets 38. A pair of shift forks 39 are fixedly attached at their one end to the shaft 37, the shift forks being provided with slots 40 at their opposite ends. The clutch collar is composed of two semi-circular elements 41 which are bolted together at their opposite ends by means of bolts 42 and each end of the clutch collar elements are provided with a projecting lug 43 which is engaged within the slot 40 of the shift fork. Thus by vertical movement of the rod 17, motion is transmitted to cause the jaw clutch to shift laterally for engagement or disengagement with either of the bevel gears 18 or 19. An arm 44 is rigidly attached at its one end to the shaft 37 and is attached at its opposite end rotatably free to one end of a connecting rod 45, the opposite end of which is connected to a link 46 attached to a crank arm 47 which communicates with an automatic locking assembly 48. The locking assembly is composed of side plates 49 secured in stationary position by means of bolts passing through lugs 50 integrally formed with the side plates. A lock block 51 is provided with a plurality of teeth 52 in concave arcuate arrangement on the lower side thereof, the lock block being supported within a lock block holder 53 provided with bearings 54 to support a shaft 55 upon which the lower end of the connecting rod 56 is attached. The upper end of the connecting rod is attached to a throw 57 of the crank arm 47. The teeth 52 of the lock block are in alignment for engagement with the lock gear 58 rigidly secured to shaft segment 21. As will be seen in FIGURE 1 of the drawing, when the jaw clutch is in a neutral position whereby the teeth on its opposite sides do not engage either of the beveled gears, the automatic locking assembly is in locked position whereby teeth 52 of the lock block engage with the lock gear 58. When the jaw clutch is in engagement with either of the beveled gears 18 and 19 the automatic locking assembly is in disengaged position, whereby the lock block is out of engagement with lock gear 58. It will be noted that the clutch collar is provided with bolts 59 having enlarged heads 60 which are threadingly engaged within the lugs 43 thereof, and which are for the purpose of providing additional safety in the event that the clutch collar binds during the operative use. When shift fork 44 engages the jaw clutch with gear 19, it is in the extreme point of travel on segment 21 of horizontal propelling shaft 20. Should member 41 bind in groove 34 momentarily, it could result in disengagement of the shift fork 44 from pins 43 which are mounted on the thrust collar 35 and which is non-rotating, the bolt heads 60 preventing this. It is to be further noted that an oil pan 61 is also provided so that the mechanism may be properly retained in oil. The oil pan is composed of an upper part formed in two sections so as to permit easier installation. The oil pan further has a lower portion which is made in a single piece and is molded to the upper sections of the oil pan. The thrust collar 62 received on shaft 21 is necessary to prevent lateral drift of shaft 21. It will still be further noted that the oil retained within the pan should be maintained at a level approximately at the center of the horizontal propelling shaft whereby all parts will be adequately lubricated.

Under travel forwards or backwards the jaw clutch is in locked engagement with bevel gear 19 as this is the bevel gear keyed to shaft 22. By locking in with bevel gear 18, the rig may be turned completely on its axis without skidding. When it is necessary to change the direction of travel a few degrees, the jaw clutch is disengaged with bevel gear 19 and is placed in a center position as will be seen in FIGURE 1 of the drawing. The machine may now change its direction of travel, in the manner presently used by skidding, the shaft element 22 being keyed to bevel gear 19 to thus provide power to travel at all times, shaft segment 21 being locked in. When it is necessary to make a sharp right angle turn or a complete turn, the jaw clutch is moved laterally to engage with bevel gear 18, in which position the rig may be turned to any point of direction without resorting to skidding or sliding because both crawler belts are in full operation, but traveling in opposite directions relative to the machinery deck. This novel method of operation can be of immense value, particularly when traveling over soft or boggy ground or graveled streams.

The power on the machinery deck of the machine used to operate the cable drums is taken out of operation and transferred to the vertical propelling shaft by changing selective gears, a jaw clutch thus being lowered and engaged with the top-most end of vertical propelling shaft that is reversible, the machine thus traveling forward or backwardly as the operator prefers.

The purpose of the drive-chain sprockets mounted on either end of the horizontal propelling shaft 20 is to drive by suitable link chain, sprockets of relatively larger diameter which are built integral with a larger sprocket and on the outer side of the chain sprocket shown. This is the belt drive sprocket that drives the crawler belt by means of lugs or teeth which engage the crawler belt through openings formed centrally in each catapillar pad.

The machinery deck 11, as stated, is a revolving deck. All the operating machinery necessary to do any type of hoisting of materials, drag line work or with shovel front attachment are mounted hereupon. There is a circular member built integral on top of the carrier body and is indicated by reference numeral 13 in the drawing. It shows a groove or race on the outer tapered side of the member and there are four rollers or dollys attached to the under part of the machinery deck which rides within this groove or race as is indicated in the drawing. Upon the inside of this circular member there is a gear rack which is engaged by a shaft called the swing shaft which extends downward from the machinery deck and by means of a gear or pinion mounted on the lower end thereof engages the gear rack. This shaft is reversible and when put in operation will rotate the machinery deck which is mounted upon the rollers as well as being mounted on or around the central pintle through which the vertical propelling shaft extends.

To make a left turn, the left crawler belt is immobilized and the right belt will be in operation, thus permitting the machine to skid or slew into a new direction. This is a method conventionally used today on this type of equipment. In the drawings the jaw clutch is shown in a centrally located position, this position automatically locks the left crawler belt rigidly. The machine may then be skidded leftward or rightward by reversing travel direction.

It will be further noted that approximately one quarter inch lateral tolerance is provided in the lock block, which will allow it to bottom at all times within the locking gear when in locked position. The ¼ inch tolerance in the lock bar 43 allows a ¼ inch lateral drift to permit the sliding jaw clutch to lock with gear 18 without resorting to rocking the machine forward or backward and to prevent the lock gear from mounting, as stated, when the jaw clutch is centrally located. The segment 21 of shaft 20 is rigidly locked when the jaw clutch is engaged with either gears 18 or 19, the lock being in a reversed position In summary, it may well be assumed that the bevel gear 18 acts as an idler except when it is engaged with the jaw clutch.

As will become apparent this easy steering improved design crawler mounted power shovel mechanism has the ability to turn in any point of direction without resorting to slewing.

What I now claim is:

In a steering mechanism, the combination of a carrier body, a revolving machinery deck on said carrier body, said revolving machinery deck having a centrally disposed shaft vertically extending downwards through said deck and said vertically extending shaft extending through said carrier body, a horizontal bevel gear supported on the lower end of said shaft, a pair of vertical bevel gears in vertical position in engagement with said horizontal bevel gear, one of said vertical gears being supported rotatably free upon a horizontal shaft and the other of said vertical bevel gears being supported in keyed relationship upon said horizontal shaft and a clutch mechanism for engaging selectively either of said vertical bevel gears, said vertically extending shaft supporting said horizontal bevel gear as a centrally disposed opening therethrough, a rod extending through said opening for vertical movement therewithin, a shift fork element, said rod being affixed to said shift fork element at its lower end, said shift fork element transmitting vertical movement of said rod to the horizontal, longitudinal movement of said jaw clutch, a linkage, a locking assembly and a lock gear, said vertical rod being further connected to said linkage to operate said locking assembly comprising a vertical slidable lock block which is selectively engageable with said lock gear, said lock gear being rigidly mounted upon a first shaft element.

References Cited by the Examiner
UNITED STATES PATENTS

| | | | |
|---|---|---|---|
| 1,588,197 | 6/1926 | Scott | 192—4 |
| 1,802,576 | 4/1931 | Ronk | 180—6.58 |
| 1,940,690 | 12/1933 | Moore | 180—6.58 |

BENJAMIN W. WYCHE III, *Primary Examiner.*

DAVID J. WILLIAMOWSKY, *Examiner.*